United States Patent [19]

Verleg et al.

[11] Patent Number: 5,393,829
[45] Date of Patent: Feb. 28, 1995

[54] RESIN COMPOSITION CONTAINING LOW-MOLECULAR WEIGHT COMPOUNDS WHICH FORM A POLYESTER URETHANE HYBRID NETWORK

[75] Inventors: Ronald L. Verleg, Weesp; Adrianus J. De Koning, Zwolle, both of Netherlands

[73] Assignee: Stamicarbon B.V., Geleen, Netherlands

[21] Appl. No.: 169,711

[22] Filed: Dec. 28, 1992

Related U.S. Application Data

[63] Continuation of Ser. No. 574,671, Aug. 30, 1990, abandoned.

[30] Foreign Application Priority Data

Jan. 6, 1990 [NL] Netherlands ................ 9000036

[51] Int. Cl.$^6$ .................. B29C 45/00; C08L 75/06
[52] U.S. Cl. ............................. 525/28; 525/440; 525/454; 525/455; 264/240; 264/328.8
[58] Field of Search ............ 525/28, 440, 454, 455; 264/240, 328.8

[56] References Cited

U.S. PATENT DOCUMENTS

| | | |
|---|---|---|
| 3,933,728 | 1/1976 | Henbest et al. |
| 4,067,845 | 1/1978 | Epel et al. ............. 525/28 |
| 4,260,538 | 4/1981 | Iseler et al. ............ 525/28 |
| 4,287,116 | 9/1981 | Burns ..................... 525/28 |
| 4,822,849 | 4/1989 | Vanderlaan ............. 525/28 |

FOREIGN PATENT DOCUMENTS

| | | |
|---|---|---|
| 0007778 | 6/1980 | European Pat. Off. |
| 0048117 | 3/1982 | European Pat. Off. ....... 525/28 |
| 1075399 | 7/1967 | United Kingdom ........... 525/28 |
| 1406545 | 9/1975 | United Kingdom . |

OTHER PUBLICATIONS

Edwards, H. R., "High Performance Urethane Modified Unsaturated Polyesters," British Plastics Fed. (1984) pp. 37–45.
Edwards, H. R., "The Use of Isophthalic Unsaturated Polyester Urethane Hybrids in Conventional Molding Technique", SPE 44th ANTEC (1986) pp. 1326–1330.
Menges, Injection Des Composants Liquides; Plastiques Modernes et Elastomeres, May 1977, pp. 46–48.
Edwards, H. R., "High Performance Urethane Modified Unsaturated Polyesters", British Plastics Fed. (1984), pp. 37–45.
Edwards, H. R., "The Use of Isophthalic Unsaturated Polyester Urethane Hybrids in Conventional Molding Technique", SPE 44th ANTEC (1986, pp. 1326–1330.

*Primary Examiner*—James J. Seidleck
*Assistant Examiner*—Thomas Hamilton, III
*Attorney, Agent, or Firm*—Cushman, Darby & Cushman

[57] ABSTRACT

The invention relates to a resin composition containing low-molecular compounds which form a polyester urethane hybrid network. The resin composition contains a first component consisting of a condensation product of at least one diol and at least one unsaturated dicarboxylic acid material, a second component containing an ethylenically unsaturated monomer capable of copolymerizing with the first component, and a third component consisting of a polyisocyanate. The first component substantially consists of a diester compound of 2 diol molecules and 1 molecule of a dicarboxylic acid material, which dicarboxylic acid material consists of at least 75% of $\alpha$-, $\beta$-unsaturated dicarboxylic acid.

23 Claims, No Drawings

RESIN COMPOSITION CONTAINING LOW-MOLECULAR WEIGHT COMPOUNDS WHICH FORM A POLYESTER URETHANE HYBRID NETWORK

This is a Rule 62 continuation application of Ser. No. 07/574,671, filed Aug. 30, 1990, entitled RESIN COMPOSITION CONTAINING LOW-MOLECULAR WEIGHT COMPOUNDS WHICH FORM A POLYESTER URETHANE HYBRID NETWORK, now abandoned.

BACKGROUND OF THE INVENTION

1. Technical Field

The invention relates to resin compositions, molded articles formed therefrom, and methods or processes for molding and/or forming molded articles. The compositions contain low-molecular weight components which form a polyester urethane hybrid network.

More specifically, the resin compositions contain a first component consisting of a condensation product of at least one diol and at least one unsaturated dicarboxylic acid-like material, a second component containing an ethylenically unsaturated monomer capable of copolymerizing with the first component, and a third component constituting a polyisocyanate.

2. Background Information

A related resin composition is described in U.S. Pat. No. 4,822,849. However, a disadvantage of this composition is that it shrinks during curing. U.S. Pat. No. 4,822,849 provides a solution for the problem by reducing the number of unsaturations in the polymer, so that the shrinkage caused by the radical polymerization is decreased. However, the disadvantage of this measure is that the mechanical properties of the material deteriorate proportionally.

SUMMARY OF THE INVENTION

The invention relates to a resin composition containing low-molecular weight components which form a polyester urethane hybrid network. The resin composition contains a first component consisting of a condensation product of at least one diol and at least one unsaturated dicarboxylic acid material, a second component containing an ethylenically unsaturated monomer capable of copolymerizing with the first component, and a third component consisting of a polyisocyanate.

The object of the invention is to provide a resin composition which does not undergo shrinkage. The solution to the shrinkage problem does not adversely affect the mechanical properties of the composition.

More specifically, in the present invention, the first component substantially consists of a diester compound of 2 diol molecules and 1 molecule of a dicarboxylic acid material, which dicarboxylic acid material consists of at least 75% of $\alpha, \beta$-unsaturated dicarboxylic acid.

All patents and publications referred to herein are hereby incorporated by reference.

DETAILED DESCRIPTION OF THE INVENTION

In the synthesis of the first component, preference is given to diols and dicarboxylic acids as starting materials, the molar ratio of the diols and the unsaturated dicarboxylic acid materials being higher than 1.5:1.

Most preferably, the molar ratio of the diol to the unsaturated dicarboxylic acid material, in the synthesis, is 2:1 or higher.

The upper limit of the amount of diol is not strictly defined because an excess of diol results in a diester compound and also an amount of non-reacted diol monomer. In the final resin composition, the excess of diol will react with the third component. However, since the mechanical properties of the articles that can be made of the resin composition may deteriorate by too high an excess, the amount of diol added will generally be such as to cause the molar ratio to the carboxylic acid-like material not to be more than 5:1 and preferably not to be more than 3:1, most preferably to be from 2:1 to 2.2:1.

The result is that the compound esterifies to an average of three monomers per molecule and therefore continues to be a low-molecular weight composition. At 23° C., the resin composition preferably has a viscosity lower than 500 mPas measured at a 65% solids content of the first component calculated on the first and second components.

The composition, according to the invention, is excellently suited for being processed via resin injection molding (RIM). In RIM, the resin composition is injected into a mold where subsequently the polymerization of the unsaturated diester compound, with the other components, takes place.

Preference is given to initiating the radical polymerization first. In the radical polymerization, there will be some degree of shrinkage. Since on average, the number of unsaturations per molecule of the first component is 1 or less, and the number of compounds with more than one unsaturation is small, a substantially linear polymer will be formed owing to the radical copolymerization with the second component. As the polymer is linear, and consequently thermoplastic, it is possible to meter an additional quantity of resin composition to the mold, so that the shrinkage is compensated.

The curing is subsequently effected via the polyisocyanates. During the curing process, the shrinkage is substantially less than during the previous radical polymerization process. Furthermore, during the formation of the urethane, cross-linking takes place. The occurrence of the various reactions, one after another, can be pre-arranged by the choice of the reaction conditions and of the various catalysts according to techniques known in the art.

For example, the urethane reaction can be catalyzed by a urethane-catalyst. However, the reaction may also take place without a catalyst. In contrast, the addition reaction always needs a catalyst; yet one may choose from a great number of (peroxide) catalysts. For example, when a peroxide catalyst is chosen for the addition polymerization which has a working range at room temperature, and no urethane catalyst is added, first, only the polymerization reaction takes place. After heating, the urethane reaction follows.

Basically, then, there are two different ways of polymerizing including: 1) the addition polymerization of the ethylenically unsaturated bonds, and 2) the urethane reaction between an isocyanate and a hydroxy group. Only the first polymerization causes a shrinkage of the material. This can amount to up to 8%. In contrast, polyurethanes hardly shrink during polymerization (i.e., less than 1%). In a normal hybrid system, the whole mixture polymerizes at the same time and therefore shrinks.

However, in the method of the present invention, one can allow the addition reaction to take place first, and let the material shrink. Because of the fact that the diester monomers have only one ethylenically unsaturated bond per molecule, the resulting polymer is one long chain (with small OH-terminated side-chains), thus thermoplastic. This means that it is possible to transform the polymeric material and thus to inject more material (polymerized or not-polymerized, preferably polymerized) into the mold. This can be done, for example, when the resin is injected into the mold, with the use of a syringe which is not emptied completely. After the first polymerization, the rest of the syringe is emptied into the mold thereby compensating for the shrinkage. The crosslinking urethane-reaction is then allowed to take place (practically without shrinkage).

In addition, it is possible to cause the radical and the urethane formation reaction to take place simultaneously in order to obtain a rapid total reaction. Further, it is possible to cause the radical reaction to take place after the urethane reaction, but then the amount of shrinkage that occurs during the curing can no longer be reduced by subsequently metering additional material.

Thus, one advantage of the resin composition according to the invention is that it is possible to use the composition for making articles in a mold, since the shrinkage that occurs is compensated for by the subsequent metering of additional material. Therefore, it is possible, inter alia, to produce articles with a smooth surface structure, possessing the shape of the mold, and also having a good dimensional stability. Such good dimensional stability means that the coefficient of expansion is practically identical under and above the glass transition temperature. Thus, the materials can be used at higher temperatures.

Another advantage of a resin composition, according to the invention, is that the non-reacted composition contains almost exclusively low-molecular weight components and is therefore of low viscosity. This is a significant advantage when used in such processes as resin transfer molding (RTM) and the above-mentioned RIM technique.

In addition, the use of the low-viscosity resin composition, according to the present invention, is a useful advantage in the production of fibre-reinforced and/or filled intermediates (prepregs or SMCs), where an improved wetting of fibres or fillers takes place owing to the low-viscosity resin.

The first component substantially contains hydroxyl-terminated diester compounds based on unsaturated dicarboxylic acid materials, but it is possible also to co-esterify an amount of saturated dicarboxylic acid-like material. Preferably not more than 25 mole % saturated dicarboxylic acid material is used.

A dicarboxylic acid material is understood to include, in addition to a dicarboxylic acid, a dicarboxylic anhydride. The unsaturated dicarboxylic acid material used may be, for instance, maleic acid, fumaric acid, citraconic acid or itaconic acid, and the saturated dicarboxylic acid used may be malonic acid, succinic acid, glutaric acid, adipic acid, sebacic acid, tetrahydrophthalic acid, hexachloroendomethylene tetrahydro-phthalic acid, dichlorophthalic acid, isophthalic acid, terephthalic acid or phthalic anhydride. Further, combinations of various acids can be used, but preference is given to the use of maleic anhydride or fumaric acid.

Suitable saturated dicarboxylic acids include, for example, terephthalic acid, isophthalic acid, adipinic acid and 1,4-cyclohexanedicarboxylic acid.

The dicarboxylic acid material is generally esterified with a diol, but it is possible also to use a minor amount of a mono-alcohol or a tri or tetra-ol as long as the number of unsaturations per three-monomer compound is lower than or equal to 1. The acid number, measured according to DIN 5.3402, expressed as the number of mg KOH required to neutralize 1 gram of material, should be $\leq 5$.

The alcohol can be chosen from, inter alia, one or more aliphatic and/or cycloaliphatic, mono, di and/or polyvalent alcohols, such as benzyl alcohol, ethylene glycol, propylene glycol, butane diol, hexane diol, cyclohexanedimethanol, hydrogenated bisphenol A, diethylene glycol, glycerol, trimethylolpropane, pentaerythritol or dipentaerythritol. Instead of, or in addition to the alcohol compound(s), one or more epoxy compounds can be used, such as, for instance, ethylene oxide, propylene oxide and/or allylglycidyl ether.

It is further possible for the alcohol used to be analkoxylated bisphenol such as, for instance, ethoxylated or propoxylated bisphenol A. An alkoxylated bisphenol is understood to mean, in this connection, a compound having the following formula I, wherein R1 and R2 are chosen from hydrogen atoms and hydrocarbon residues, preferably from alkyl groups, particularly methyl groups.

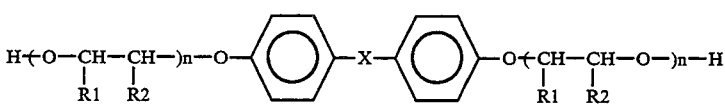

I

In the invention, the value of n+m is normally smaller than 12. Preferably, n and m are both approximately 1 on average. X represents a —CH2—, —C(CH3)2—, —SO2— or —O— bond. If so desired, one or both aromatic groups may be fully saturated in the formula I diol.

Preferably, alkoxylated bisphenol A is used, and more preferably, ethoxylated bisphenol A. Surprisingly, with these materials, it was found to be possible, while retaining the mechanical properties of the end product, and particularly while retaining the impact resistance, to reach a heat deflection temperature 40° C. higher than the heat deflection temperature of conventional cured polyester urethanes, as known from Edwards, H. R., High Performance Urethane Modified Unsaturated Polyesters, paper 10, BPF Brighton Conference, pp. 37–45 (1982).

The heat deflection temperature (HDT) is measured according to American Standard Test Method (ASTM) D-648-72. The heat deflection temperature is the temperature at which the material begins to deflect under local loading thereby loosing its form. Above this temperature, one has difficulty using the material. Thus, materials with high HDTs can be used at higher temperatures than materials with lower HDTs.

In addition to the HDT, the corrosion resistance of the polymer product of the present invention proves to be excellent.

In U.S. Pat. No. 3,933,728, a mixture of a polyurethane and an unsaturated polyester is described. In the mixture, the polyurethane, too, is unsaturated and can form cross linkages with the unsaturated polyester via an ethylenically unsaturated monomer. The patent discusses the possibility of the polyurethane being built up from the condensation products of an unsaturated dicarboxylic acid and a diol, mention being made also of bisphenol derivatives. However, a person skilled in the art who by chance would use the dicarboxylic acids according to the present invention, in the system of U.S. Pat. No. 3,933,728, would not obtain the results according to the present invention because that system also contains at least 10% unsaturated polyester which, owing to the higher viscosity, makes it virtually impossible for the product to be used in injection systems.

Furthermore, the system yields articles having properties different from those of a resin composition according to the present invention. The system described in U.S. Pat. No 3,933,728 is therefore meant to be used in sheet molding compound (SMC) applications.

The unsaturated monomer forming the second component of the present invention can be chosen from all monomers capable of reacting with ethylenic unsaturations of the diester, inter alia, vinyl monomers, such as, vinyl esters, aromatic vinyl compounds and vinyl nitriles. Examples are styrene, α-methylstyrene, p-methylstyrene, vinyl toluene and acrylic acid or methacrylic acid (hydroxy) esters of alcohols with 1 to 12 carbon atoms. Preference is given to the use of styrene. Also suitable are mixtures of monomers, particularly of styrene and other monomers. If a (meth)acrylic acid hydroxyester of a dialcohol is used, extra cross-linking may still take place owing to a reaction with isocyanate which may have a positive effect on the properties of the end product. It is possible also to use difunctional monomers, such as divinylbenzene or diallylphthalate.

The ratio of the second component and the first component is from 80:20 to 20:80 (in weight). Preferably the ratio is from 70:30 to 30:70. The choice depends, inter alia, on the desired viscosity of the resin composition.

The third component contains at least an average of more than 1.75 isocyanate groups and preferably, 2 to 3 isocyanate groups per molecule. More preferably, the functionality is 2.2 to 2.7 on average. The polyisocyanate may, for instance, be an aliphatic, an aromatic, a cycloaliphatic polyisocyanate or a combination of two or more different grades. Examples are toluene diisocyanates, 1,5-naphthalene diisocyanate, cumene-2,4-diisocyanate, 4-methoxy-1,3-phenylene diisocyanate, 4-chloro-1,3-phenylene diisocynate, 4-bromo-1,3-phenylene diisocyanate, 4-ethoxy-1,3-phenylene diisocyanate, 2,4'-diisocyanatodiphenylether, 5,6-dimethyl-1,3-phenylene diisocyanate, 2,4-dimethyl-1,3-phenylene diisocyanate, 4,4'-diisocyanate diphenylether benzidine diisocyanate, 4,6-dimethyl-1,3-phenylenediisocyanate, durene diisocyanate, 4,4'-diisocyanate dibenzyl,3,3'-dimethyl-4,4'-diisocyanate diphenyl, 2,4-disiocyanatestilbene, 3,3'-dimethoxy-4,4'-diisocyanate phenylmethane, 3,3'-dimethoxy-4,4'-diisocyanate diphenyl, 1,4-anthracenediisocyanate, 2,5-fluorene diisocyanate, 1,8-naphthalenediisocyanate, 2,6-diisocyanato benzofuran amyl benzene-2,4-diisocyanate, hexylbenzene-2,4-diisocyanate, dodecylbenzene-2,4-diisocyanate, butylbenzene-2,4-diisocyanate. Preferably the polyisocyanate is carbodiimide-modified diphenylmethane 4,4'-diisocyanate.

It is possible to influence the degree of cross-linking by the addition of mono-functional isocyanates or mono-alcohols. It is also possible to vary the number of cross linkages per amount of resin composition by adding more than 2 moles diol, calculated on the dicarboxylic acid-like material. Optionally, an excess of polyisocyanate may also be added so that longer polyurethane chains are formed.

The number of isocyanate groups calculated on the number of hydroxyl groups (NCO/OH) is generally from 0.8 to 1.6 (mole/mole). It is possible to add a larger ratio of isocyanate groups, but then the mechanical properties of articles produced from the resin composition will deteriorate.

The mixture usually contains catalysts promoting the copolymerization of the unsaturated monomer with the unsaturated polyester. These may, in principle, be the same catalyst systems as those used with normal unsaturated polyesters. When used in the RIM system, gas formation is undesirable and that is why moisture-containing peroxide catalysts are less desirable. Examples of appropriate catalysts are radical-developing substances suitable in a concentration of 0.5 to 5% (wt) of the total composition, for instance, peroxides such as hydroperoxides, ketone peroxide and peresters. Specific examples include benzoyl peroxide, ditertiary butyl peroxide, cyclohexanoneperoxide, tertiary butylperbenzoate and tertiary butylperoctoate, as well as photoinitiators sensible to visible light or ultraviolet light.

The amount of catalyst is usually from 0.5 to 5% (wt) calculated on the unsaturated components. In addition, a conventional accelerator may be present, for instance, a cobalt compound or an amine.

The composition may further contain catalysts for the urethane reaction. If both catalyst systems are used, the gelation may be very rapid so that short cycle times can be realized in the production.

Polyester urethane compositions, as in the invention, have a low viscosity and can therefore be easily molded or injection-molded. It is also possible to fill the composition with fillers, fibre-reinforcements and the like without the viscosity increasing to such a degree that the composition can no longer be used in, for instance, the RIM process.

The composition may contain fibrous reinforcements to improve the mechanical properties of the articles produced with the composition. Generally, 5 to at least 75 percent by weight of fibrous material can be-added.

Suitable fibrous materials are glass, asbestos, carbon and organic fibrous materials, such as aromatic polyamides. Glass fibres may be present in any suitable form, for instance, in the form of a mat, ribbon or tape, in the form of continuous fibres or in the form of chopped staple fibres. Continuous fibres may form a random structure or be incorporated in a fabric.

When the resin mixture is used in the RIM process, it is possible for the fibrous reinforcement to be added to the mixture to be injected, provided these fibres are short enough, and it is possible also for the fibrous structure to be introduced into the mold before the injection.

The composition may also contain other additives, such as pigments, stabilizers, for instance, anti-oxidants and UV stabilizers, or fillers like talcum, mica, calcium carbonate, aluminum or carbon black.

Compositions according to the invention can be used, inter alia, for the production of articles according to the RIM technique. Generally, the products will be sold in a two-part system, the first part of which contains the diester and the second part of which contains the polyisocyanate. The amount of ethylenically unsaturated monomer can be divided over the two parts or can be completely added to one of the parts.

More specifically, the first part may comprise a first component which consists of a condensation product of at least one diol and at least one unsaturated dicarboxylic acid. The first part may also comprise at least a portion of a second component which consists of an unsaturated monomer capable of polymerizing with the first component. The second part may comprise a third component which contains a polyisocyanate. The second part may also comprise the remainder or rest of the second component.

The first component substantially consists of a diester compound of 2 diol molecules and 1 molecule of a dicarboxylic acid material. The dicarboxylic acid material consists of at least 75% $\alpha$-, $\beta$-unsaturated dicarboxylic acid. The catalysts and/or initiators are divided over these components according to a method known to a person experienced and skilled in the art.

The invention will be elucidated by means of the following examples and comparative examples without being limited thereto.

The mechanical properties were determined as follows: tensile strength, elongation at break and E modulus according to DIN (Deutsche Industrie Norm or German Industrial Standard) 53455, flexural strength and E modulus according to DIN 53452, impact strength according to DIN 53453, HDT according to ASTM-D-648-72 and Barcol hardness according to ASTM-D-2583. The acid number was determined according to DIN 5.3402. The hydroxyl number was determined according to DIN 53240. The viscosity was determined according to DIN 53019.

EXAMPLE 1

Formation of a Solution Using Ethoxylated Bisphenol A, Fumaric Acid and Hydroquinone Into a 10-liter reactor, equipped with a stirrer, a nitrogen gas inlet pipe, a thermocoupler and a distillation column, an amount of 8450 g (26.7 moles) ethoxylated bisphenol A (bisphenol A. 2EO), 1551 g (13.4 moles) fumaric acid and 1.5 g (150 ppm) hydroquinone was introduced. The mixture was heated to 210° C. At this temperature, the condensation reaction was carried out until the acid number was lower than 5. The reaction product was cooled to 120° C. and dissolved in 5125 g styrene inhibited with 1.46 g (100 ppm) benzoquinone. The solution obtained had a solids content of 64.9%, an acid number of 2.1 mg KOH/g, an hydroxyl number of 102 mg KOH/g and a viscosity (at 23° C.) of 345 mPas.

EXAMPLE 2

Formation of a Solution Using Propoxylated Bisphenol A, Maleic Anhydride and Hydroquinone The process of example 1 was repeated using 8959 g (26.0 moles) propoxylated bisphenol A (bisphenol A. 2PO), 1276 g (13.0 moles) maleic anhydride and 1.5 g (150 ppm) hydroquinone. The reaction product was dissolved in 5385 g styrene inhibited with 1.5 g (100 ppm) benzoquinone. The resulting solution had a solids content of 64.9%, an acid number of 3.1 mg KOH/g, an hydroxyl number of 100 mg KOH/g and a viscosity (at 23° C.) of 370 mPas.

EXAMPLE 3

Formation of a Solution Using Propylene Glycol and Maleic Anhydride

The process of example 1 was repeated using 1216 g (16.8 moles) propylene glycol, and 784 g (8.0 moles) maleic anhydride in a 2-liter reactor. The resulting reaction product was cooled to 30° C. and dissolved in 700 g styrene inhibited with 0.035 g (50 ppm) benzoquinone. The resulting solution had a solids content of 65.0% and a viscosity (at 23° C.) of 110 mPas.

COMPARATIVE EXAMPLE A

Formation of a Solution Using Isophthalic Acid, Ethylene Glycol, Maleic Anhydride and Hydroquinone The process of example 1 was repeated using 2698 g (16.3 moles) isophthalic acid, 1975 g (31.9 moles) ethylene glycol, 3313 g (31.9 moles) neopentyl glycol, 3185 g (32.5 moles) maleic anhydride and 1 g (100 ppm) hydroquinone. The reaction product was dissolved in 5385 g styrene inhibited with 0.5 g (33 ppm) benzoquinone. The resulting solution had a solids content of 65.0%, an acid number of 1.4 mg KOH/g, an hydroxyl number of 87 mg KOH/g and a viscosity (at 23° C.) of 420 mPas.

EXAMPLES 4a and 4b

Preparation of Test Sheets for Testing Mechanical Properties

From the solutions of a) example 1 and b) example 2, test sheets were made in the following manner: In 300 g of the resulting solution, 6 g benzoyl peroxide was dissolved as a radical initiator. Subsequently, the mixture was deaerated. After that were supplied 0.6 g diethylaniline as accelerator and 76.5 g carbodiimide-modified methylene-diphenyl-4,4'-diisocyanate with a functionality of 2.3, and the whole was mixed. The mixture was deaerated. The mixture was poured out between two flat sheets measuring 20×40×4 mm. The sheet was cured at room temperature for 20 hours. From the resulting sheet, test bars were sawn. These were subjected to after-curing for 8 hours at 120° C. The mechanical properties of the test bars were determined. The results are shown in table 1.

COMPARATIVE EXAMPLES Ba and Bb

Preparation of Test Sheets Using the Solution of Comparative Example A

The process of example 4 was repeated using the solution of comparative example A.

In example Ba, the curing cycle according to example 4 was followed. In example Bb, the test bar was cured at 57° C. for 16 hours and subjected to after-curing at 80° C. for 2 hours. The results of the measurements are shown in table 1.

TABLE 1

Results of the mechanical property measurements of the products formed in example 4 and comparative example B.

|  | Example | | Compar. exp. | |
| --- | --- | --- | --- | --- |
|  | 4a | 4b | Ba | Bb |
| Tensile strength (MPa) | 94 | 87 | 82 | 83 |
| Elongation at break (%) | 6.9 | 4.9 | 2.6 | 5.3 |
| E modulus (MPa) | 3140 | 3060 | 3640 | 3570 |
| Flexural strength (MPa) | 148 | 139 | 171 | 146 |

TABLE 1-continued

Results of the mechanical property measurements of the products formed in example 4 and comparative example B.

|  | Example | | Compar. exp. | |
| --- | --- | --- | --- | --- |
|  | 4a | 4b | Ba | Bb |
| E modulus (MPa) | 3035 | 3030 | 3875 | 3660 |
| Impact strength (kJ/m$^2$) | 37 | 32 | 21 | 27 |
| HDT (°C.) | 124 | 118 | 95 | 76 |
| Barcol hardness | 32 | 37 | 39 | 39 |

EXAMPLES 5a, 5b and 5c

Addition of Varying Amounts of a Urethane Catalyst to the Solution of Example 2

Using the resulting solution of example 2, an examination was made of the effect of a urethane catalyst on the mechanical properties of the cured product.

The process of example 4a was repeated in which a) 0 grams, b) 0.06 grams or c) 0.12 grams of dibutyl tin diacetate was added simultaneously with the diethylaniline.

The results of the mechanical property measurements are shown in Table 2.

TABLE 2

The effect of the urethane catalyst on the mechanical properties of the cured products of example 5.

|  | Example | | |
| --- | --- | --- | --- |
|  | 5a | 5b | 5c |
| dibutyl tin diacetate (g) | 0 | 0.06 | 0.12 |
| tensile strength (MPa) | 87 | 87 | 86 |
| elongation at break % | 4.9 | 6.7 | 6.5 |
| E modulus (MPa) | 3060 | 2980 | 3000 |
| flexural strength (MPa) | 139 | 131 | 135 |
| E modulus (MPa) | 3030 | 2980 | 3010 |
| impact strength (kJ/m$^2$) | 32 | 36 | 39 |
| HDT (°C.) | 118 | 115 | 117 |
| Barcol hardness | 37 | 37 | 38 |

From table 2, it may be concluded that the urethane catalyst has no appreciable effect on the mechanical properties measured.

EXAMPLES 6a, 6b and 6c

The Addition of Varying Amounts of MDI To The Solution of Example 2

Using the resulting solution of example 2, an examination was made of the effect of the amount of MDI (carbodiimide-modified methylene-diphenyl-4,4'-diisocyanate with functionality 2,3) on the mechanical properties of the cured system.

The process of example 4a was repeated with a) 61.2 g MDI (NCO/OH=0.8), b) 76.5 g MDI (NCO/OH=1.0) and c) 91.8 g MDI (NCO/OH=1.2). 0.03 g dibutyl tin diacetate was used. The results are shown in table 3.

EXAMPLE 7

The Addition of An Extra Amount of Diol To The Solution of Example 2

Using the resulting solution of example 2, an examination was made of the effect of an extra amount of diol.

The process of example 4a was repeated, adding to the mixture also 75 g ethoxylated bisphenol A with an average of 12 EO units per bisphenol A and 26.5 g MDI. The results are shown in table 3.

TABLE 3

The effect of the amount of diisocyanate on the mechanical properties of the product of example 6, and the effect of an extra amount of diol on the mechanical properties of the product of example 7.

|  | Example | | | |
| --- | --- | --- | --- | --- |
|  | 6a | 6b | 6c | 7 |
| MDI (g) | 61.2 | 76.5 | 91.8 | 76.5 |
| tensile strength (MPa) | 83 | 85 |  | 89 |
| elongation at break % | 6.7 | 6.5. |  | 5.6 |
| E modulus (MPa) | 3150 | 3030 |  | 3280 |
| flexural strength (MPa) | 137 | 137 | 142 | 144 |
| E modulus (MPa) | 3170 | 3040 | 3090 | 3140 |
| impact strength (kJ/m$^2$) | 21 | 35 | 27 | 49 |
| HDT (°C.) | 95 | 110 | 97 | 80 |
| Barcol hardness | 32 | 30 | 30 | 30 |

From table 3, it may be concluded that within the limits of NCO/OH=0.8 to 1.2, the amount of diisocyanate has no appreciable effect on the mechanical properties measured.

From table 3, it may also be concluded that an increased amount of diol results in an increase in the impact resistance measured via the impact strength. At the same time, the heat deflection temperature, measured via HDT, decreases.

We claim:

1. A two-part system containing at least a first, second and third component, wherein the first part of said system comprises a first component consisting of a condensation product of at least one diol and at least one unsaturated dicarboxylic acid, and a second component consisting of an unsaturated monomer capable of polymerizing with the first component, and the second part comprises a third component which contains a polyisocyanate, and a catalyst, wherein said second part optionally comprises the rest of the second component, wherein the first component consists essentially of a diester compound of 2 diol molecules and 1 molecule of a dicarboxylic acid material, said dicarboxylic acid material consisting of at least 75% α-,β-unsaturated dicarboxylic acid, and wherein when said components are combined, the resulting resin composition is capable of being cured by undergoing a urethane polymerization reaction and a radical polymerization reaction to obtain a polyester urethane hybrid network.

2. A molded article formed with the two-part system of claim 1.

3. A composition obtained by allowing the first part according to claim 1 to react with the second part according to claim 1.

4. Composition suitable for resin injection moulding or resin transfer moulding of an article with high impact resistance and a high heat deflection temperature, which composition comprises a resin composition and a catalyst for the radical polymerization of the resin composition, wherein said resin composition is capable of being cured by undergoing a urethane polymerization reaction and a radical polymerization reaction to obtain a polyester urethane hybrid network, said resin composition consisting essentially of low-molecular weight compounds, said resin composition containing a first component consisting essentially of a condensation product of at least one diol and at least one unsaturated dicarboxylic acid material, said first component having at least two hydroxyl groups with the proviso that said first component consists essentially of a diester compound of: 1) 2 diol molecules and 2) 1 molecule of a dicarboxylic acid material, which dicarboxylic acid material consists of at least 75% of α-,β-unsaturated dicarboxylic acid, and a second component which consists essentially of an ethylenically unsaturated monomer capable of copolymerizing with the first component, and, as a third component, a polyisocyanate.

5. Resin composition according to claim 4, characterized in that the diol molecules and the molecules of the dicarboxylic acid-like materials are present in the first component in a ratio higher than 1.75:1.

6. Resin composition according to claim 4, characterized in that the diol molecules and the molecules of the dicarboxylic acid materials are present in the first component in a ratio equal to or higher than 2:1.

7. Resin composition according to claim 4, characterized in that the diol is an alkoxylated bisphenol A.

8. Resin composition according to claim 4, characterized in that the dicarboxylic acid material is maleic anhydride or fumaric acid.

9. Resin composition according to claim 4, characterized in that the polyisocyanate is a carbodiimide-modified diphenylmethane 4,4'-diisocyanate.

10. Resin composition according to claim 4, characterized in that the second component is styrene.

11. Resin composition according to claim 4, characterized in that, with a 65% solids content of the first component calculated on the first and second components, the resin composition has a viscosity lower than 500 mPas at 23° C.

12. A process for forming molded articles which comprises injecting into a mold the resin composition of claim 4,
allowing the injected resin composition to polymerize and cure in the mold and form said article, and removing the molded article from the mold.

13. A process according to claim 12 wherein radical polymerization between the first and second components components is carried out prior to affecting curing with the polyisocyanate.

14. An article obtained by curing a resin composition according to claims 12.

15. A process for making a composition according to claim 4 which comprises (a) allowing said first component to react with said second component whereby an intermediate is obtained, and (b) allowing the intermediate to react with said third component.

16. A composition according to claim 4, wherein said second component consists essentially of at least one member selected from the group consisting of styrene, alpha-methyl styrene, para-methyl styrene, and vinyl toluene.

17. A composition according to claim 4, wherein said second component consists of at least one member selected from the group consisting of styrene, alpha-methyl styrene, para-methyl styrene, and vinyl toluene.

18. A process for forming molded articles which comprises the steps of:

injecting into a mold a composition wherein said composition comprises:
a resin composition and a catalyst for the radical polymerization of the resin composition, which resin composition consists essentially of low-molecular compounds which form a polyester urethane hybrid network, which resin composition contains a first component consisting of a condensation product of at least one diol and at least one unsaturated dicarboxylic acid material, a second component containing an ethylenically unsaturated monomer capable of copolymerizing with the first component, and a third component constituting a polyisocyanate, wherein the first component substantially consists of a diester compound of 2 diol molecules and 1 molecule of a dicarboxylic acid material, which dicarboxylic acid material consists of at least 75% of α-,β-unsaturated dicarboxylic acid;
allowing the injected resin composition to polymerize and cure in the mold and form said article;
injecting an additional quantity of said resin composition into the mold after initiation of polymerization to compensate for shrinkage of the molded article caused by radical polymerization between the first and second components; and
removing said article from said mold.

19. The process of claim 18 wherein said diol molecules and the molecules of the dicarboxylic acid materials of said composition are present in the first component in a ratio higher than 1.75:1.

20. The process of claim 18 wherein the diol of said composition is an alkoxylated bisphenol A.

21. The process of claim 18 wherein the dicarboxylic acid material of said composition is maleic anhydride or fumaric acid.

22. The process of claim 18 wherein, with a 65% solids content of the first component calculated on the first and second components, the resin composition has a viscosity lower than 500 mPas at 23° C.

23. A composition suitable for resin injection moulding or resin transfer moulding of an article with high impact resistance and a high heat deflection temperature, which composition comprises
a resin composition and a catalyst for the radical polymerization of the resin composition, wherein
said resin composition consists essentially of low-molecular weight compounds which are capable of being cured by undergoing a urethane polymerization reaction and a radical polymerization reaction to obtain a polyester urethane hybrid network,
said resin composition contains a first component consisting of a diester condensation product of at least two diols and at least one unsaturated dicarboxylic acid which consists of at least 75% of α-,β-unsaturated dicarboxylic acid, said first component having at least two hydroxyl groups,
a second component consisting essentially of an ethylenically unsaturated monomer capable of radically copolymerizing with the first component, and,
a third component consisting essentially of a polyisocyanate.

* * * * *

UNITED STATES PATENT AND TRADEMARK OFFICE
CERTIFICATE OF CORRECTION

PATENT NO.    : 5,393,829
DATED         : February 28, 1995
INVENTOR(S)   : Verleg et al.

It is certified that error appears in the above-identified patent and that said Letters Patent is hereby corrected as shown below:

Column 4, in formula I, change "n" (second occurrence) to --m--.

Column 5, line 61, change "2,4-disiocyanates-" to --2,4-diisocyanates--.

Signed and Sealed this

Twenty-first Day of November, 1995

Attest:

BRUCE LEHMAN

Attesting Officer

Commissioner of Patents and Trademarks